United States Patent
Tägtström (12)

(10) Patent No.: US 6,341,924 B1
(45) Date of Patent: Jan. 29, 2002

(54) INSERT FOR THE CUTTING OF GROOVES

(75) Inventor: Pär Tägtström, Sandviken (SE)

(73) Assignee: Sandvik AB (SE)

( * ) Notice: Subject to any disclaimer, the term of this patent is extended or adjusted under 35 U.S.C. 154(b) by 0 days.

(21) Appl. No.: 09/581,994

(22) PCT Filed: Dec. 17, 1998

(86) PCT No.: PCT/SE98/02372

§ 371 Date: Jun. 21, 2000

§ 102(e) Date: Jun. 21, 2000

(87) PCT Pub. No.: WO99/34947

PCT Pub. Date: Jul. 15, 1999

(30) Foreign Application Priority Data

Dec. 22, 1997 (SE) ............................................... 9704871

(51) Int. Cl.⁷ ........................... B23B 27/08; B23P 15/30
(52) U.S. Cl. ..................... 407/114; 407/115; 407/116; 407/117
(58) Field of Search ............................. 407/113, 114, 407/115, 116, 117, 69, 70

(56) References Cited

U.S. PATENT DOCUMENTS

| | | | |
|---|---|---|---|
| 4,632,608 A | 12/1986 | Blomberg et al. | |
| 4,669,925 A | * 6/1987 | Lowe et al. | 407/114 |
| 4,755,085 A | 7/1988 | Murén et al. | |
| 5,032,050 A | * 7/1991 | Niebauer et al. | 407/114 |
| 5,505,569 A | 4/1996 | Gustafsson et al. | |
| 5,765,972 A | * 6/1998 | Ericksson et al. | 407/114 |

* cited by examiner

Primary Examiner—Henry Tsai
(74) Attorney, Agent, or Firm—Burns, Doane, Swecker & Mathis, L.L.P.

(57) ABSTRACT

The present invention relates to an indexable cutting insert (10) for the turning of grooves with triangular basic shapes where each insert corner features a projection (16). Each projection supports a transverse cutting edge (17) and connecting diverging cutting edges (18, 19), so that the projection (16) seen in a view directly from above has a symmetrical shape. The one outer side edge (18) of the projection (16) is bordered by an unbroken flat flank surface (22) whilst the connecting flank surface on the other side edge (19) is comprised of two partial surfaces (27, 28) of which the one nearest the edge (19) partial surface (27) has a smaller clearance angle than the partial surface (28) nearest the bottom.

10 Claims, 2 Drawing Sheets

INSERT FOR THE CUTTING OF GROOVES

The present invention relates to an indexable cutting insert with a basically triangular shape for the turning of grooves, said insert comprising an upper surface, a lower surface, which is substantially parallel to the upper surface, plus the edge surfaces which connect them. Each cutting corner of the insert is provided with a projection, which carries a cutting edge arranged substantially at right angles to the direction of the groove. The edges of the insert projection, which are connected, to the cutting edge diverge in the direction of the groove so that the projection has a symmetrical shape in relation to the direction of grooving. Each projection is arranged almost entirely outside a triangle which is defined by an imaginary circle which is inscribed round the centre of the insert and which has the outer surfaces of the insert cutting the circle tangentially.

Triangular, indexable inserts for grooving, which are known from prior art, have designs, which require a relatively large amount of cemented carbide. Cemented carbide is expensive and therefore it is economically advantageous if each insert requires as little cemented carbide as possible. The designs of known inserts are such that holders are required with insert seats especially designed for each insert size. Further accessibility with known inserts in confined spaces is very limited.

One object of the present invention is to design an indexable insert so that only a reduced volume of cemented carbide is required for its manufacture.

Another object is to design the geometry of the insert so that they can be formed with a larger volume of insert material under the cutting edge when the tool is to be used for axial grooving. Greater grooving depths thereby become possible.

A further object is to create an insert with three cutting edges, which can be indexed as required.

A further object is to design an insert so that it can satisfactorily manage the first incut during which a long unbroken chip is normally formed.

The invention is more closely described hereinafter with reference to the appended figures.

Figure 1:
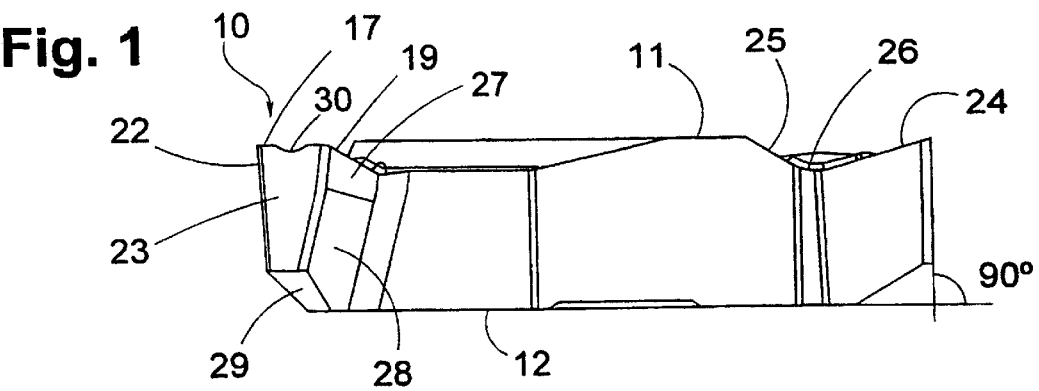
FIG. 1 shows a cutting insert for grooving according to the invention in a side view.

FIGS: 1 and 2 show an indexable insert (10) for grooving. The insert (10) has a triangular basic shape and comprises an upper surface (11) and a lower surface (12) plus the connecting side surfaces (13, 14, and 15). The sides (11, 12) are substantially parallel. The side surfaces (13–15) connect the sides at substantially right angles. The cutting insert is provided with a centre hole (29), which extends substantially at right angles to the sides (11, 12). Each edge surface, e.g. (13), consists of two, in relation to each other, convex, stepped, planar parts (13a, 13b), of which one part (13a) is arranged to act as a support surface against an insert seat. The part (13b) is arranged in such a way that contact is avoided with the workpiece during the grooving operation. The part (13a) forms part of a side of an imaginary triangle, defined in such a way that its three sides cut tangentially a circle (C) inscribed around the centre of the insert (10). The part (13b) forms a tangent to the circle (C) in the same way as part (13a). The insert has three cutting corners, which are identical, and therefore from here on only one is described. A projection (16) is provided at each cutting corner, which links the parts (15b) and (14b). The projection has a substantially straight cutting edge, which is substantially parallel to the part (14b). The cutting edge (17) is connected via its ends to the edges (18, 19), which converge in the direction inwards from the cutting edge. The cutting edge (17) is substantially at right angles with the grooving direction, which is marked (I). The edges (18, 19) form a sharp angle with each other which is in the range 1 to 10°, preferably 3 to 5° so that the projection (16), as seen in a view directly from above, has a symmetrical shape in relation to the direction of grooving (I). The edge (18) retains its direction until it connects to the part (15b) via a concave edge (20). The edge (19) connects, in a similar manner, to part (14b) via a concave edge (21). The surface (22) beneath edge (18) forms a clearance angle ($\alpha$). The surface (23) below the cutting edge (17) on the other hand forms a 90-degree angle with the plane, which includes the bottom surface (12). A rake face (24) slopes inwards and-downwards from the cutting edge (17) and forms a sharp wedge angle with surface (23). An inward and upward sloping rear surface (25) connects to the rake face (24) via a rounding off (26). The rear surface (25) is connected also to the upper surface (11) of the insert.

Figure 5:
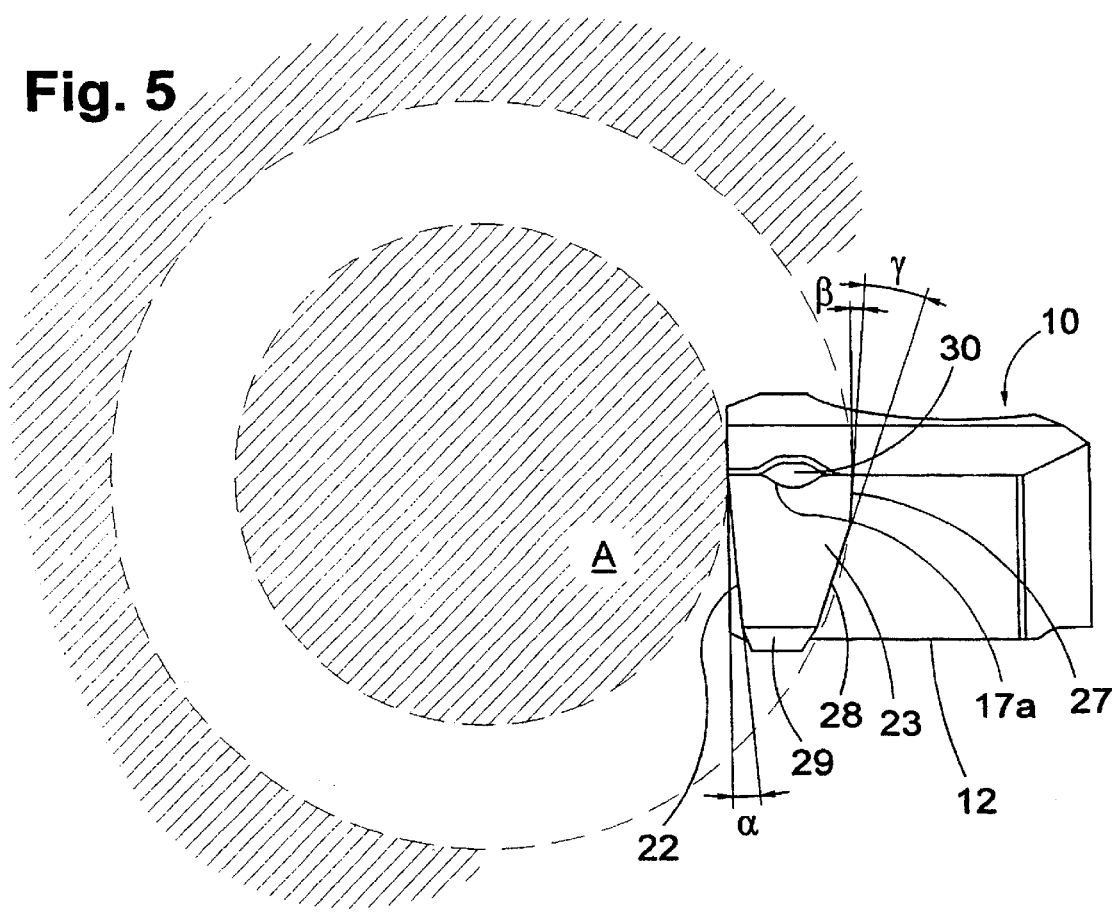
FIG. 5 shows a cutting insert, in a front view, in cutting action in an axial grooving operation.

The surface (27) below the edge (19) is straight and unbroken from the upper side of the insert a distance downwards until it forms a clearance angle ($\beta$). The surface (27) then connects via an obtuse angle to the lower surface (28) which extends uninterrupted all the way down until it forms an intersection in the form of an obtuse angle with a slanting upwards sloping bottom surface (29) of the projection (16). The clearance angle of the surface (27) is shown as ($\gamma$). A chip forming dimple (30) is formed centrally on the upper side of the projection (16), the said dimple cuts through the main cutting edge (17), so that it features in its middle part a bowed, depressed cutting edge portion (17a). The chip breaking dimple is in its turn divided into a forward (31) and a rear (32) dimple part, the latter being superimposed the former, whereby the bottom of the latter is located higher than the bottom (31) of the forward part of the dimple. This means that the forward part (31) has gradually increasing depth inwards towards the insert and then decreasing depth. The transition between these two parts of the dimple is in the form of a border line (33) or an equivalent radial transition. The borderline (33) is shaped as a substantially equally sided point which points towards the main cutting edge (17). Two ridges (34, 35) are provided along opposite sides of the dimples which extend in the inserts longitudinal direction and diverge at a slight angle, they are positioned at the same height or somewhat higher than the plane which is defined by the side edges (18, 19). The ridges extend forwards until they transform in the proximity of, but not right up to, the main cutting edge (17) into two fingers, (36, 37) which diverge at a relatively large angle. By arranging ridges in the manner described above it is possible to ensure that the chips will remain in contact with the forward part of the ridges or fingers (36, 37) and that the central part of the chip is brought deeper down into the dimple (31), which means that the total breadth of the chip will be smaller and that it will be easier to handle and that no damage to the sidewalls of the dimple will be caused by the chip during the machining of a metal workpiece by the insert. Furthermore it is essential that the V-shaped transition line is the upper border line of a slanting backwards sloping wall, against which the chip comes into direct contact during machining, after which it is brought upwards to the same level as the upper surface (11) along which it slides backwards. At both moderate and more powerful rates of feed chip formers, as described above, have proved to contribute to the chips being formed in an advantageous manner and that at the same time a certain reduction in the cutting forces can be obtained. Characteristic for the design of the new insert is the projections, which are formed at each corner of the insert. Thanks to the double angled form of the surface parts (27) and (28) of the protrusion (16), it becomes possible to manufacture an insert via direct pressing, with a strong cutting edge area (17) as compared to if the side surfaces (27, 28) were to have been built up of an unbroken surface with one and the same angle of slope. In FIG. 5 it has been shown more closely how the insert described above is intended for axial grooving in a workpiece (A). The clearance angle of the surface (22) is denoted as ($\alpha$) and it should be between 1–8°, preferably 3–6°. The clearance angle of the surface (27) is denoted as ($\beta$), which should be 3–12°, preferably 5–8° and the clearance angle for the lower flank (28) with ($\gamma$), this angle should be in the range 10–30°, preferably 15–20°.

Figure 2:
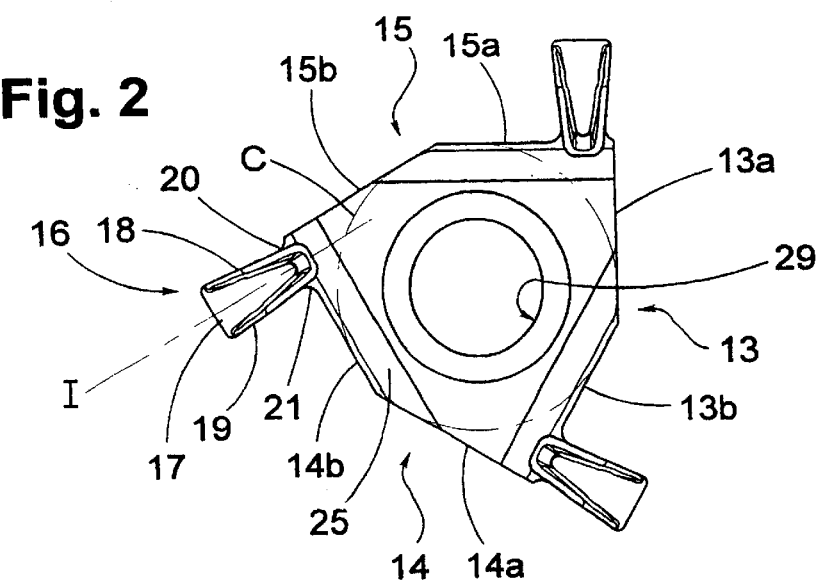
FIG. 2 shows the insert in a top view.
Figure 3:
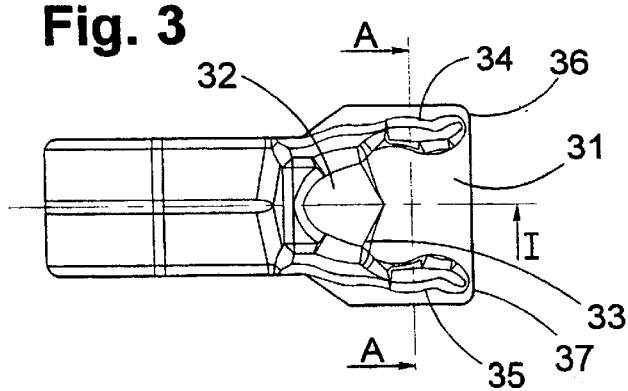
FIG. 3 shows the cutting corner of the insert in a top view.
Figure 4:
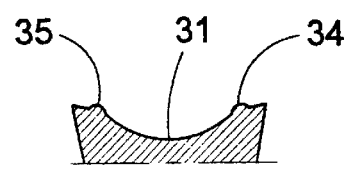
FIG. 4 shows a cross section of the cutting corner according to the line A—A in FIG. 3.
Figure 6:
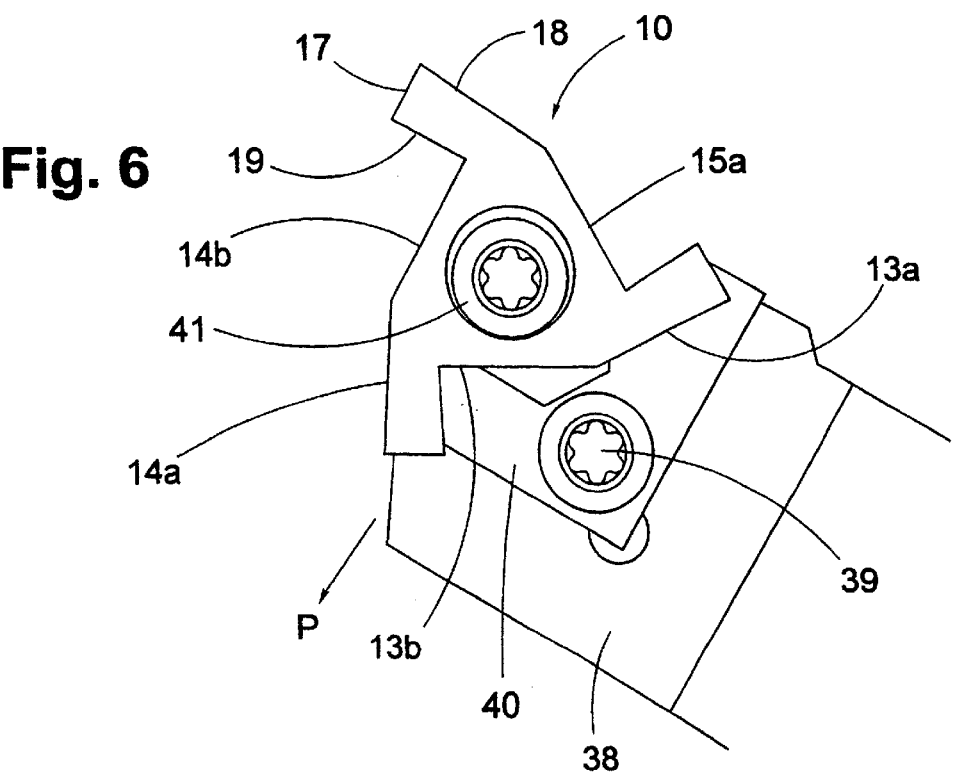
FIG. 6 shows part of a tool for grooving, in a top view, comprising an insert according to the invention.

FIG. 6 shows an example of a tool for grooving, comprising an insert (10) of the type shown in FIGS. 1 and 2. The tool includes a holder (38) with an insert seat (40) fixed in the holder (38) by means of a threaded screw (39). The insert (10) is locked against the insert seat by a screw (41), which is screwed into a threaded bore in the holder. It can be readily understood from FIG. 5 that the eccentric position of the screw (41) in relation to the hole (29), in the insert that the insert will be pressed in a direction corresponding to that of the arrow (P). The insert is thereby brought, in a reliable manner, to abut with two of its sides (13a) and (13b) against corresponding sides in the insert seat (40).

What is claimed is:

1. An indexable insert for the turning of grooves comprising:
    an upper surface;
    a lower surface substantially parallel to the upper surface; and
    a plurality of connecting side surfaces extending between the upper surface and the lower surface and arranged such that said insert is generally triangular and defines three cutting corners;
    wherein a projection is disposed at each cutting corner of the insert, each projection having an upper side, a lower side, and a cutting edge arranged substantially at a right angle to a direction of grooving of the insert,
        wherein each projection includes a first edge and a second edge which are each connected to the cutting edge and diverge in the direction of grooving, each of the first edge and the second edge including a flank, and
    wherein each projection is arranged totally outside a triangle defined by an imaginary inscribed circle against which each connecting side surface of the insert lies tangentially, and the flank connected to the first edge of the projection has one uninterrupted flat surface whilst the flank connected to the second side surface comprises first and second partial surfaces,
        the first partial surface running unbroken from the upper side of the projection to connect at an obtuse angle to the second partial surface running unbroken from the lower side.

2. The indexable insert according to claim 1, wherein the first partial surface slopes with a clearance angle ($\beta$) which is less than a clearance angle ($\gamma$) of the second partial surface adjacent to the bottom surface.

3. The indexable insert according to claim 1, wherein a distal surface situated below each cutting edge is arranged so that it forms a right angle with a plane which encloses the lower surface.

4. The indexable insert according to claim 1, wherein each projection defines a longitudinal direction, and further comprising a rake face including two dimples of different depths which are each surrounded on either side by a plurality of ridges extending in the longitudinal direction of the projection and converging the further out they are, each ridge having a rear ridge and a forward ridge, the rear ridge converging at a smaller angle than that of the forward ridge.

5. The indexable insert according to claim 1, wherein a transition between a chip forming a forward and rear dimple part on an upper side of the projection at a forward position is made up of an equal sided point which points towards the cutting edge.

6. The indexable insert according to claim 1, wherein the projection has a symmetrical shape in relation to the direction of grooving and when seen in a view from directly above.

7. The indexable insert according to claim 1, wherein a clearance angle ($\alpha$) of the flank connected to the first edge of the projection is 1–8° and the clearance angle ($\beta$) of the first partial surface is 3–12°.

8. The indexable insert according to claim 1, wherein the clearance angle ($\gamma$) of the second partial surface is 10–30°.

9. The indexable insert according to claim 7, wherein the clearance angle ($\alpha$) of the flank connected to the first edge of the projection is 3–6°, and the clearance angle ($\beta$) of the first partial surface is 5–8°.

10. The indexable insert according to claim 8, wherein the clearance angle ($\gamma$) of the second partial surface is 15–20°.

* * * * *